United States Patent [19]
Dufour et al.

[11] Patent Number: 5,878,349
[45] Date of Patent: *Mar. 2, 1999

[54] CALL SET-UP ON 800 MHZ ANALOG VOICE CHANNEL FROM 1900 MHZ DIGITAL CONTROL CHANNEL

[75] Inventors: Daniel Dufour, Blainville; Richard J. Brunner, Montreal; Ulises Olvera-Hernandez, Bellevue, all of Canada

[73] Assignee: Telefonaktiebolaget L M Ericsson, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 682,984

[22] Filed: Jul. 16, 1996

[51] Int. Cl.$^6$ .............................. H04B 7/26; H04Q 7/22; H04Q 7/38
[52] U.S. Cl. ......................... 455/438; 455/439; 455/443; 455/444; 455/452
[58] Field of Search ..................................... 455/422, 436, 455/438, 439, 443, 444, 450, 451, 452, 454

[56] References Cited

U.S. PATENT DOCUMENTS

| | | | |
|---|---|---|---|
| 5,457,736 | 10/1995 | Cain et al. ............................... | 455/439 |
| 5,493,693 | 2/1996 | Tanaka et al. ............................ | 455/438 |
| 5,504,939 | 4/1996 | Mayrand et al. ....................... | 455/34.1 |
| 5,557,657 | 9/1996 | Barnett ..................................... | 455/444 |
| 5,585,850 | 12/1996 | Schwaller ................................ | 455/454 |
| 5,657,375 | 8/1997 | Connollly et al. ...................... | 455/436 |

FOREIGN PATENT DOCUMENTS

| | | |
|---|---|---|
| 0 661 893 A3 | 7/1997 | United Kingdom . |
| WO 90/13187 | 11/1990 | WIPO . |

OTHER PUBLICATIONS

M. Isaksson, et al., "D–AMPS 1900—The Dual–Band Personal Communications System," *Ericsson Review*, 72, No. 2, (Jan. 1995), pp. 73–79.

*Primary Examiner*—Howard Britton
*Attorney, Agent, or Firm*—Jenkens & Gilchrist, P.C.

[57] ABSTRACT

In a cellular network having a first cluster of base stations serving a first group of mobile stations over digital RF channels and a second cluster of base stations, collocated with said first cluster, for serving a second group of mobile stations over analog RF channels, wherein some of the base stations in the second cluster have cells which overlap with cells of the first cluster, a method is disclosed for setting up a call on an analog voice channel of a base station of the second cluster while a mobile station is being served on a digital control channel of a base station in the first cluster.

18 Claims, 5 Drawing Sheets

FIG.1

——— 1900 MHz cell
━━━ 800 MHz cell

CALL SET-UP ON 800 MHZ ANALOG VOICE CHANNEL FROM 1900 MHZ DIGITAL CONTROL CHANNEL

FIELD OF THE INVENTION

This invention relates to digital cellular systems, but more particularly to a method of setting up a call on an 800 MHz analog voice channel from a 1900 MHz digital control or traffic channel.

BACKGROUND OF THE INVENTION

In 1994, the United States Federal Communications Commission auctioned licences to support PCS 1.9 gigaHertz (GHz) radio frequency spectrum for PCS services in North America. PCS 1900 as it is called, is a variation of the International Global System for Mobile Communications (GSM) Standard. It is one of several new standards for North American PCS.

In order to facilitate the deployment of PCS 1900, equipment manufacturers and PCS service providers are working together to provide a suitable transition of one system to another by providing multi-mode mobile stations. The use of multi-mode mobile stations enables a service provider to overcome limitations inherent in the operating frequency of conventional PCS 1900 systems. In particular, conventional 1.9 GHz systems transmit information only about half as far as existing 800 MHz cellular systems because they incur more radio frequency transmission losses. Because of their shorter wavelengths, mobile radios are therefore limited to smaller service areas for collecting incoming signals. This reduction in range results in a substantial cost disadvantage for operators of conventional PCS 1900 systems. A service provider of PCS 1900 systems would have to deploy four times as many base stations to cover the same area as an existing 800 MHz cellular system. Long range and wide area of coverage is especially critical for urban areas as well as in suburban and rural applications.

By providing multi-mode or multi-standard mobile radios, a service provider can provide subscribers with the option of using one cellular standard or the other.

The 1900 MHz air Interface Standard which is described in J-STD-011 enables the Mobile Station (MS) subscriber to request a change in their MS service code. The MS service code provides the cellular network with an indication of the subscriber preference for analog or digital traffic channels. Although the standard allows a user or subscriber to use the MS service code to request an analog voice channel when served on a 1900 MHz digital traffic channel (DTC), systems that support only 1900 MHz cells cannot provide a handoff to an analog voice channel which might have been requested by a MS subscriber. Although MS subscriber can continue using their handsets for voice communication, the ability to offer handoffs between a digital traffic channel and an analog voice channel becomes particularly important if a subscriber operates on the 1900 MHz standard and requires the use of the handset for data services using FSK modulation. Unfortunately, data services using FSK modulation is not currently possible on the 1900 MHz cellular standard. An MS subscriber that requires the use of a data terminal such as a modem connected to a computer or a facsimile machine (other than G3 class) which operates on FSK modulation, will require access to an analog voice channel in order to complete the call with the data terminal.

Accordingly, a need exists for a system and method for setting up a call on an analog voice channel when the subscriber's mobile station is being served on a DCCH or DTC system that does not support analog voice channel.

SUMMARY OF THE INVENTION

It is therefore an object of the present invention to provide a method of setting-up a call on an analog voice channel for users operating on a digital control channel.

Another object of the present invention is to provide a method of handing off a call for a mobile station operating on a digital traffic channel to an analog voice channel.

Another object of the present invention is to provide a method of setting-up a call on an analog voice channel operating on an hyperband cell which is overlaid over a cell serving a mobile station on a DCCH or DTC.

Another object of the present invention is to provide a method of setting-up a call on an analog voice channel operating on an hyperband cell which is collocated with a cell serving a mobile station on a DCCH or DTC.

Yet another object of the present invention is to provide a method of setting-up a call on a candidate analog voice channel selected by a mobile switching controller from a list of candidates detected by the mobile station.

According to an aspect of the present invention there is provided a cellular network having a first cluster of base stations serving a first group of mobile stations over digital RF channels and a second cluster of base stations, collocated with said first cluster, for serving a second group of mobile stations over analog RF channels, wherein some of said base stations in said second cluster have cells which overlap with cells of said first cluster, a method of setting up a call on an analog voice channel of a base station of said second cluster while a mobile station is being served a digital control channel of a base station in said first cluster, comprising the steps of:

receiving at a serving base station of said first cluster, a mobile station service code indicative of an analog voice channel preference;

forwarding said mobile station service code to a mobile switching controller;

instructing said serving base station to set up a call with said mobile station on a digital traffic channel;

determining if a cell of a base station from said second cluster is overlapping a cell which corresponds to said serving base station;

if an overlapping cell is available, determining if an analog voice channel is available on said overlapping cell; and     if an analog voice channel is available, instructing said serving base station and said mobile station to handoff to said analog voice channel on said overlapping cell.

According to another aspect of the present invention, there is provided a cellular network having a first cluster of base stations serving a first group of mobile stations over digital RF channels and a second cluster of base stations, collocated with said first cluster, for serving a second group of mobile stations over analog RF channels, wherein some of said base stations in said second cluster have cells which overlap with cells of said first cluster, a method of setting up a call on an analog voice channel of a base station of said second cluster while a mobile station is being served a digital traffic channel of a base station in said first cluster, comprising the steps of:

receiving at a serving base station a mobile station service code indicative that said mobile station is requesting an analog voice channel;

forwarding said mobile station service code to a mobile switching controller;

determining if a cell of a base station from said second cluster is overlapping a cell which corresponds to said serving base station;

if an overlapping cell is available, determining if an analog voice channel is available on said overlapping cell; and if an analog voice channel is available, instructing said mobile station and said serving base station to handoff to said analog voice channel from said digital traffic channel.

DESCRIPTION OF THE PREFERRED EMBODIMENT

Figure 1:
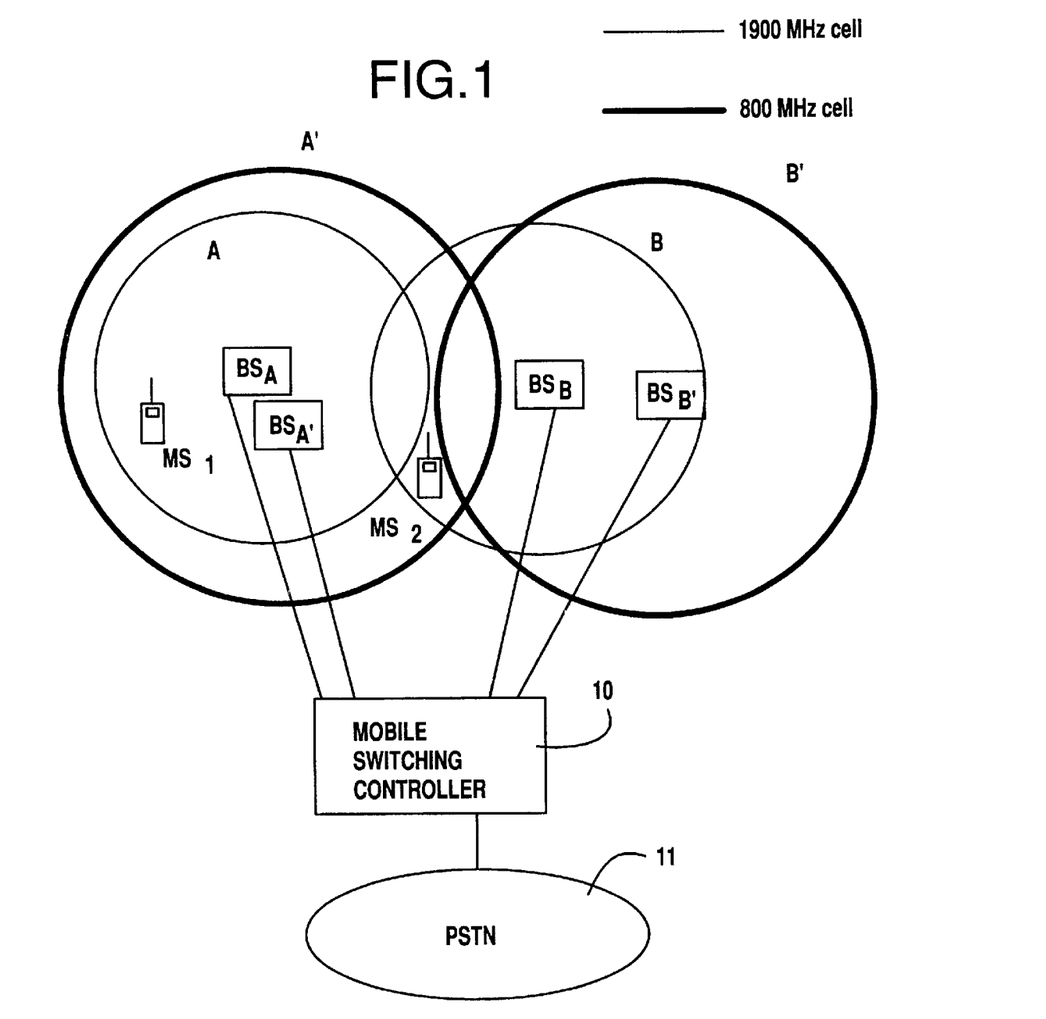
FIG. 1 is a block diagram illustrating cells operating on one standard and which are collocated with cells operating on another standard.

Referring now to FIG. 1, we have shown a cellular network wherein a cellular service provider is equipped with cell sites operating on two separate standards. That is, wherein cells of one standard are collocated with cells of another standard. It should be noted that although the method and system of the present invention is directed to a network having 1900 MHz and 800 MHz cell sites, the invention is equally applicable to cellular networks operating on other standards wherein subscribers being served on a DCCH or DTC require access to an Analog Voice Channel (AVC). In order to allow for sufficient radio coverage at handoff from a 1900 MHz DTC to an 800 MHz AVC the collocated hyperband cell concept is introduced.

The collocated hyperband cell refers to a collection of 800 MHz analog voice channels, served by a first cluster of cells, which geographically cover approximately the same area as a collection of 1900 MHz digital traffic channel, served by a second cluster of cells, but which are logically separated from the 1900 MHz channels (i.e. the 1900 MHz channels and the 800 MHz channel belong to different cells).

In the illustration of FIG. 1, a cellular service provider has a number of collocated cell sites. In FIG. 1, cell site A and cell site B are neighbouring cell sites operating on one standard, whereas cell site A' and cell site B', also neighbours, operate on another standard. The systems operating the cell sites provide geographically the same coverage, but are independently operated. Although as a system, each provide generally the same coverage, cells of one system do not necessarily overlap. This is caused by the fact that cell sites operating on different frequencies, will likely have different coverage. As shown in FIG. 1, although cell A' overlaps cell A, cell B' does not overlap cell B. Therefore, although cells of one standard have collocated cells in the other standard, not all cells of one standard will completely overlap the cells in the other standard. The knowledge of whether a target cell overlaps a serving cell is important in determining whether a MS can be set-up or can handed off from a cell of one standard to a cell of another standard. In FIG. 1, cell A' is considered a collocated hyperband overlaid cell because it completely overlaps cell A. On the other hand, cell B' is considered a collocated hyperband neighbour since it only partly overlaps cell B.

In the example of FIG. 1, it will be assumed that cells A and B, which are serviced by base stations $BS_A$ and base station $BS_B$, provide digital control and traffic channels to $MS_1$ and $MS_2$, respectively. Cell A' and B' on the other hand provide analog voice channels. Therefore, mobile station $MS_1$, can operate on digital cellular service from cell A and request a call set-up or handoff to an analog voice channel of collocated hyperband overlaid cell A'. On the other hand, $MS_2$ can operate on digital cellular service from cell B, but would only be able to request a call set-up or handoff to an analog voice channel of collocated hyperband neighbouring cell A' since cell B' is not in range. Other mobile stations will of course access digital or analog control channels in accordance with relevant air interfaces supported by the mobile station terminal.

In the case of the 800 MHz standard, the interface is dictated by the EIA/TIA IS-54 standard, whereas the 1900 MHz air interface is dictated by the J-STD-011 standard. It should be noted that under IS-54, a mobile station can either access an analog or a digital 800 MHz control channel. A mobile switching controller (MSC) 10 can provide service to each cell site and subscriber access to the Public Switched Telephone Network (PSTN) 11. The MSC 10 has a list of all cells in the area near the mobile station. A collocated hyperband cell does not have to be defined, by command, as part of the list of neighbours measured by the MS during a mobile assisted Handoff process since it is automatically considered as a neighbour when a Handoff Request for an AVC is received in the MSC 10.

Figure 2:
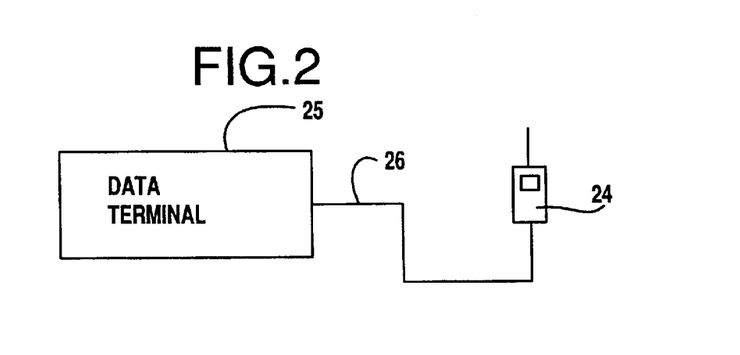
FIG. 2 is a block diagram illustrating a data terminal connected to a mobile station.

As shown in FIG. 2, if a mobile station 24 subscriber desires to make use of a data terminal 25 such as a modem-connected computer or facsimile machine, the mobile station 24 can be provided with an interface cord 26 that enables the user to connect the data terminal 25. However, as indicated earlier, if the data terminal 25 operates with FSK modulation, to make use of the data terminal 25, the mobile station 24 subscriber would have to either indicate a preference for analog service or initiate a hand off from a digital control channel to an analog voice channel.

Referring now to FIGS. 3a, 3b, 4a and 4b, we have shown flow diagrams illustrating two call set-up scenarios.

Figure 3A:
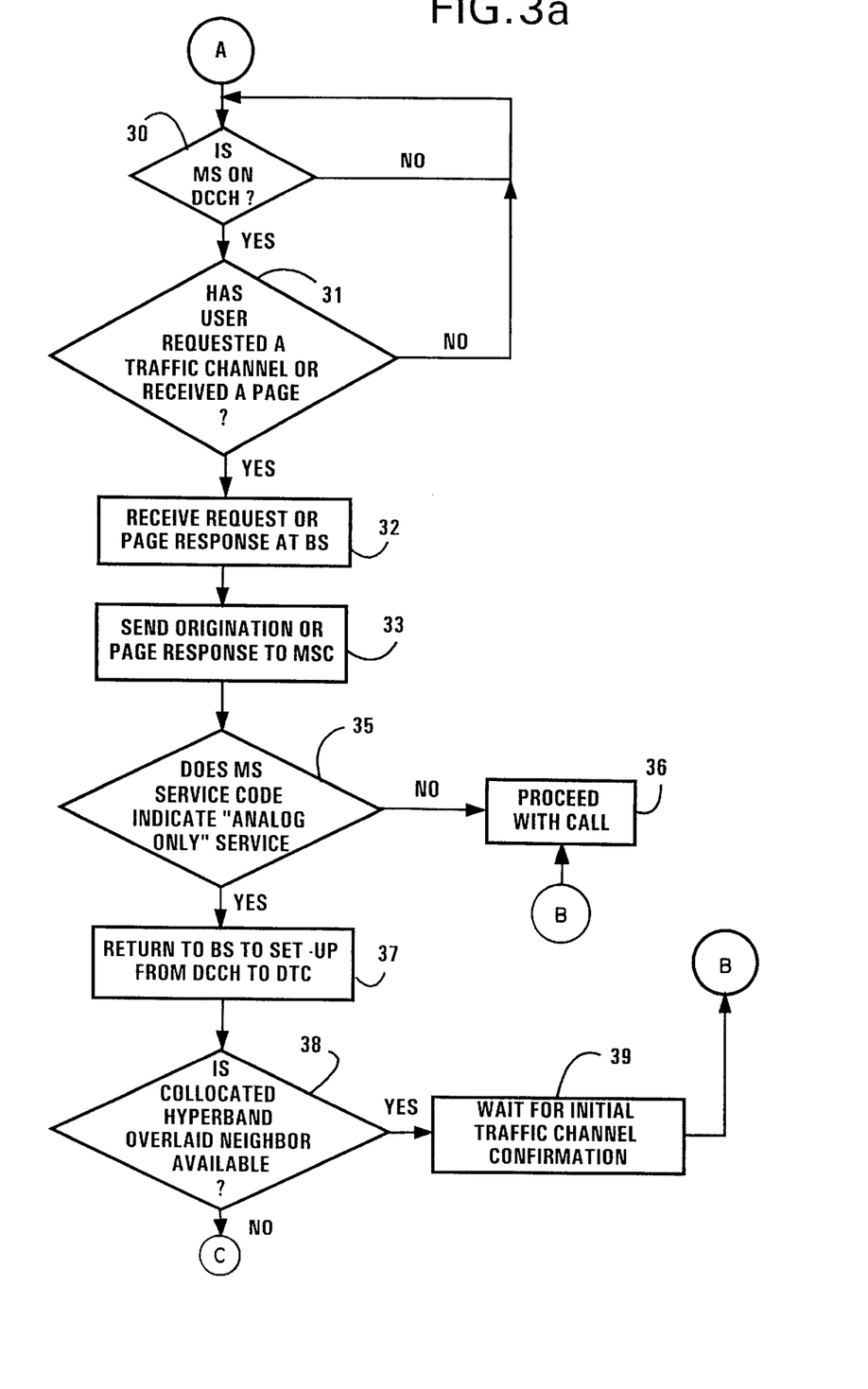
FIGS. 3a and 3b illustrate a flow diagram for call set-up from a digital control channel to an analog voice channel.
Figure 3B:
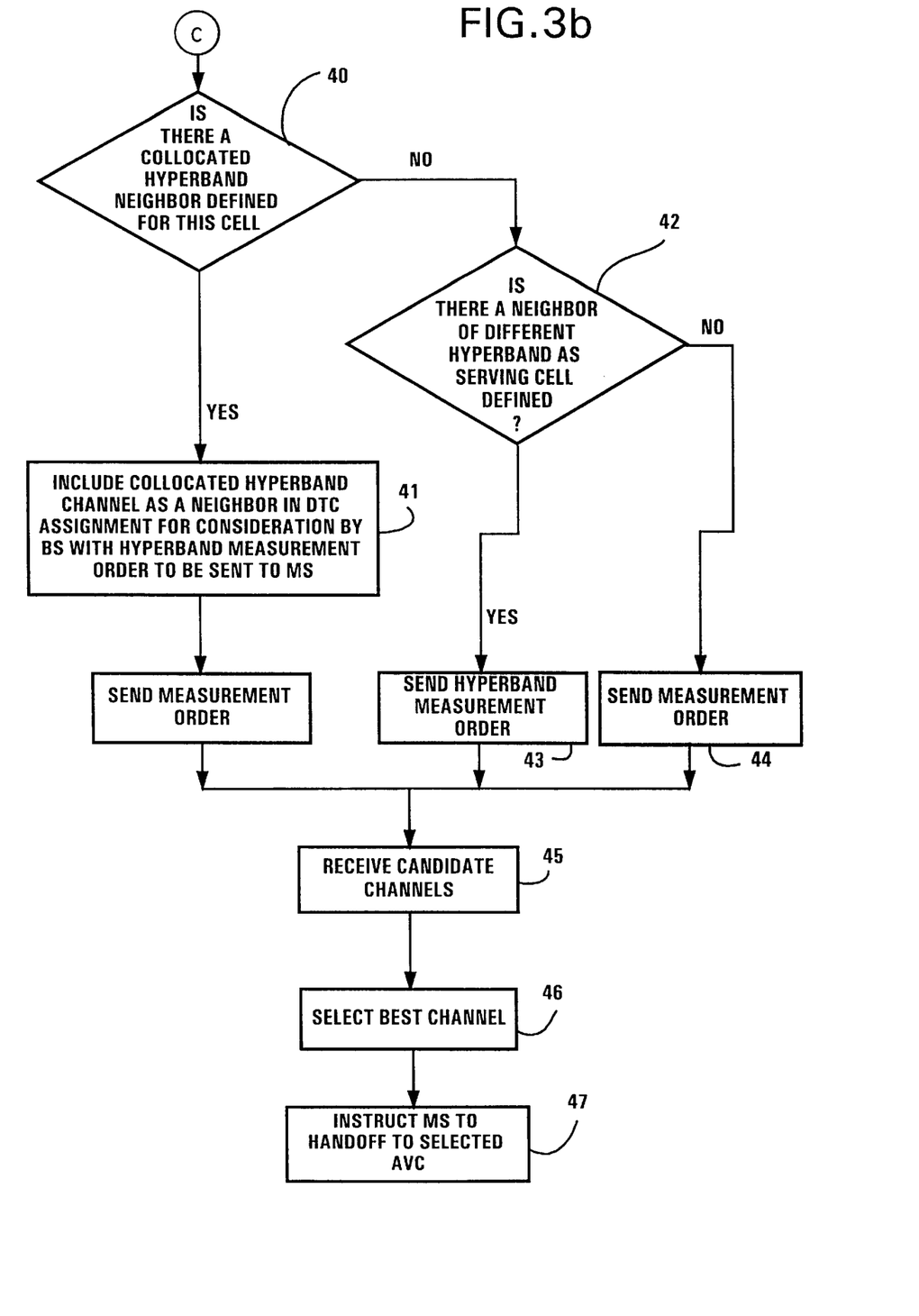

In the call set-up of FIGS. 3a and 3b, a call set-up for a digital cellular subscriber to an analog voice channel is attempted.

In this example, a dual mode (analog/digital) dual band (1900 MHz/800 MHz) mobile station (MS) camps or is in a standby mode on a Digital Control Channel (DCCH). While on a DCCH 30, the user can either originate a request 31 for an analog voice channel or receive a page from a serving base station indicating an incoming call. If the subscriber's service code indicates "analog only" service, the subscriber's origination message or the Page Response is sent from the MS and received 32 at the BS. The subscriber's origination message or the Page Response is then transferred 33 to the MSC.

The origination or Page Response is processed by the MSC. If the service code indicates service on a digital channel 35, the call can proceed as required 36. If it is determined that the service code indicates a request for an analog voice channel only, the call has to be initially set-up on a digital traffic channel, since the MS is on stand-by on a DCCH. The call is then returned to the base station to initiate call set-up from a DCCH 36.

If a collocated hyperband neighbouring cell which is defined as overlaid is available 38, then the base station waits for an Initial Traffic Channel Confirmation message 39 and the call can proceed to step 36 above.

If a collocated hyperband neighbour is defined 40 for this cell, then the collocated hyperband channel is included 41 as one neighbour in the DTC assignment so that the BS considers it for sending of the Hyperband Measurement Order 48 towards the MS.

Note that the BS can be instructed to initiate the Handoff Process at DTC designation or it can be initiated in the MSC itself without waiting for the BS to trigger it.

If a different hyperband neighbour is defined as the serving cell 42, then an Hyperband measurement order is sent 43. If not defined, then a measurement order is sent 44. If candidate channels are provided 45, then the BS selects the best channels to handoff to 46. The MS is then instructed to tune to the selected AVC 47.

Once the Mobile Station's presence is verified in the candidate cell, the MS is instructed to handoff to the verified candidate channel. Optionally, the channel quality can be verified by the mobile station.

Figure 4A:
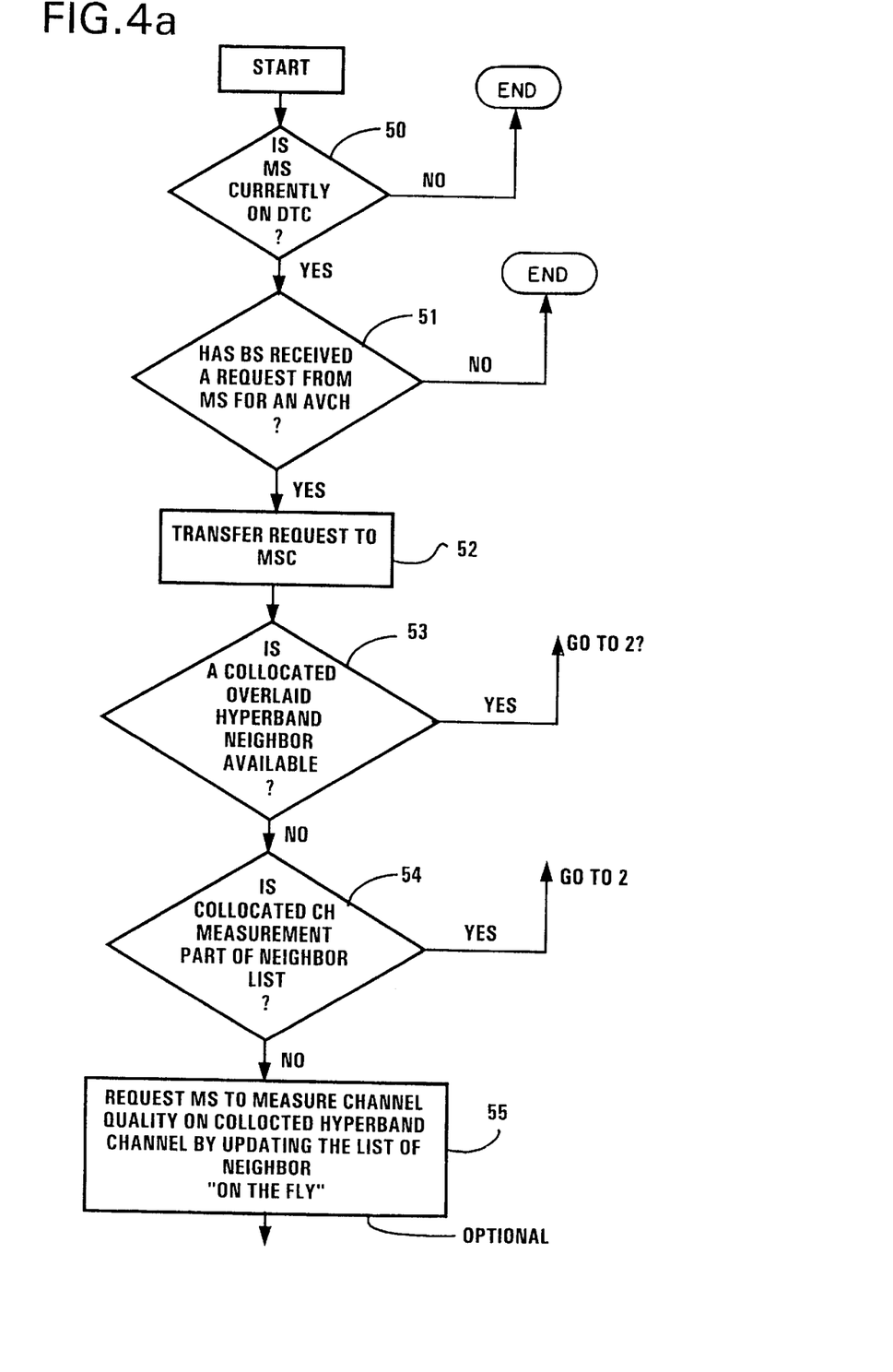
FIG. 4a and 4b illustrate a flow diagram of a user-initiated handoff from a digital traffic channel to an analog voice channel.
Figure 4B:
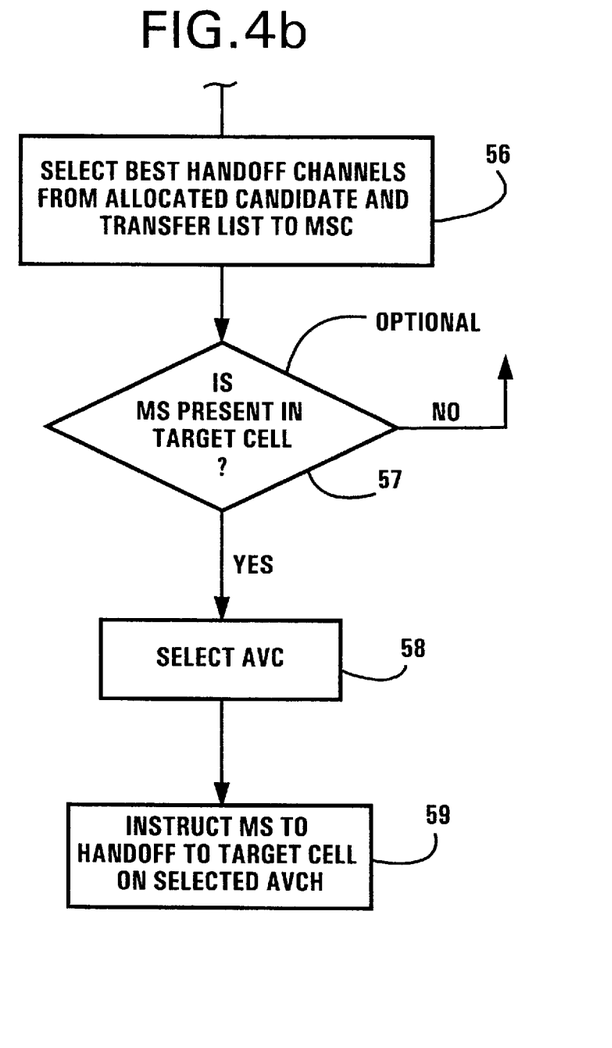

The flow diagrams of FIGS. 4a and 4b are directed to a call scenario wherein a user initiates a handoff from a DTC of one cellular service to AVC of another cellular service.

In this call scenario, the dual mode (analog/digital) dual band (1900 MHz/800 MHz) mobile station (MS) is currently being served by a Digital Traffic Channel (DTC) 50. While in this state, the user requests an AVC through the Service Request message.

The request message is received in the BS 51 and transferred 52 to the MSC.

Optionally it could be required to perform measurements prior to the selection of the AVC and if this is the case, the MS could be instructed to measure on the collocated hyperband channel. If a collocated hyperband neighbour defined as overlaid is available 53, then the call is transferred to the MSC for processing.

If Collocated Channel Measurement is part of the Neighbour List 54, then the call is transferred to the MSC for processing. Otherwise, a request is made to the MS 55 to measure on the Collocated Hyperband Channel by updating the list of neighbour "on the fly". That is, while the mobile station is on a DTC.

The BS selects 56 the best handoff channels from the allocated candidates and transfers the list to the MSC.

Once the MSs presence is verified 57 in the candidate cell the MS is instructed to select an AVC 58 and to handoff 59 to the verified candidate.

The embodiment of the invention in which an exclusive property or privilege is claimed are defined as follows:

1. In a cellular network having a first cluster of base stations serving a first group of mobile stations over digital RF channels and a second cluster of base stations, collocated with said first cluster, for serving a second group of mobile stations over analog RF channel;, wherein some of said base stations in said second cluster have cells which overlap with cells of said first cluster, a method of setting up a call on an analog voice channel of a base station of said second cluster while a mobile station is being served by a digital control channel of a serving base station in said first cluster, comprising the steps of:

receiving at said serving base station of said first cluster, a mobile station service code indicative of an analog voice channel preference;

forwarding said mobile station service code to a mobile switching controller;

instructing said serving base station to set up a call with said mobile station on a digital traffic channel;

determining if a cell of a base station from said second cluster is overlapping a cell which corresponds to said serving base station;

if an overlapping cell is available, determining if an analog voice channel is available on said overlapping cell; and if an analog voice channel is available, forcing said serving base station and said mobile station to engage in an inter-cell handoff to said analog voice channel on said overlapping cell.

2. A method as defined in claim 1, further comprising the step of determining if a collocated neighbouring cell is available, if an overlapping cell is not available.

3. A method as defined in claim 2, further comprising the step of determining if an analog voice channel is available on said collocated neighbouring cell.

4. A method as defined in claim 3, further comprising the step of instructing said serving base station and said mobile station to hand off to said analog voice channel.

5. A method as defined in claim 3, further comprising the step of instructing said mobile station to measure the RSSI level of candidate analog voice channels available from said collocated neighbouring cell and forwarding a list of candidate channels to said mobile switching controller.

6. A method as defined in claim 5, further comprising the step of selecting, at said mobile switching controller, a preferred candidate voice channel and instructing said serving base station and said mobile station to handoff to the selected candidate analog voice channel.

7. In a cellular network having a first cluster of base stations serving a first group of mobile stations over digital RF channels and a second cluster of base stations, collocated with said first cluster, for serving a second group of mobile stations over analog RF channels, wherein some of said base stations in said second cluster have cells which overlap with cells of said first cluster, a method of setting up a call on an analog voice channel of a base station of said second cluster while a mobile station is being served by a digital traffic channel of a serving base station in said first cluster, comprising the steps of:

receiving at said serving base station a mobile station service code indicative that said mobile station is requesting an analog voice channel;

forwarding said mobile station service code to a mobile switching controller;

determining if a cell of a base station from said second cluster is overlapping a cell which corresponds to said serving base station;

if an overlapping cell is available, determining if an analog voice channel is available on said overlapping cell; and if an analog voice channel is available, forcing said mobile station and said serving base station to engage in an inter-cell handoff to said analog voice channel from said digital traffic channel.

8. A method as defined in claim 7, further comprising the step of determining if a collocated neighbouring cell is available, if an overlapping cell is not available.

9. A method as defined in claim 8, further comprising the step of determining if an analog voice channel is available on said collocated neighbouring cell.

10. A method as defined in claim 9, further comprising the step of instructing said serving base station and said mobile station to handoff to said analog voice channel.

11. A method as defined in claim 9, further comprising the step of instructing said mobile station to measure the RSSI level of candidate analog voice channels available from said collocated neighbouring cell and forwarding a list of candidate channels to said mobile switching controller.

12. A method as defined in claim 11, further comprising the step of selecting, at said mobile switching controller, a preferred candidate voice channel and instructing said serving base station and said mobile station to handoff to the selected candidate analog voice channel.

13. A method of operating a cellular telecommunications network having a plurality of base stations and wherein a cell is associated with each base station, wherein the network is capable of at least two modes of communication, comprising the steps of:

operating a first set of base stations to communicate in a first mode;

operating a second set of base stations to communicate in a second mode;

transmitting from a mobile station to a first base station in the first set of base stations a request to communicate in the second mode;

detecting whether a second base station in the second set of base stations has a cell associated therewith which overlaps the cell associated with the first base station; and if such overlap is detected, forcing the first base station and the mobile station to engage in an inter-cell hand off to the second base station.

14. The method of claim 13, wherein the first mode is analog communication.

15. The method of claim 13, wherein the second mode is digital communication.

16. The method of claim 13, further comprising:

if such overlap is not detected, detecting whether a collocated neighbouring cell operating in the second mode is available; and if such collocated cell is available, handing off to the base station associated with the collocated neighbouring cell.

17. The method of claim 16, further comprising:

if such overlap is detected, transmitting a set of available channels in the second mode; and selecting one of the available channels.

18. The method of claim 17, wherein the selecting step further comprises:

measuring the RSSI level of the set of available channels.

* * * * *

UNITED STATES PATENT AND TRADEMARK OFFICE
CERTIFICATE OF CORRECTION

PATENT NO. : 5,878,349
DATED : Mar. 2, 1999
INVENTOR(S) : Dufour et al.

It is certified that error appears in the above-identified patent and that said Letters Patent is hereby corrected as shown below:

Column 5, line 58    Replace "channel;,"
                                     With --channels,--

Signed and Sealed this

Fourth Day of April, 2000

Attest:

Q. TODD DICKINSON

Attesting Officer          Director of Patents and Trademarks